United States Patent
Kim et al.

(10) Patent No.: US 11,575,774 B2
(45) Date of Patent: *Feb. 7, 2023

(54) METHOD AND APPARATUS FOR PROVIDING DATA IN EDGE COMPUTING SYSTEM

(71) Applicant: Samsung Electronics Co., Ltd., Gyeonggi-do (KR)

(72) Inventors: Hyesung Kim, Gyeonggi-do (KR); Sunghoon Kim, Gyeonggi-do (KR); Jicheol Lee, Gyeonggi-do (KR); Yoonseon Han, Gyeonggi-do (KR)

(73) Assignee: Samsung Electronics Co., Ltd.

(*) Notice: Subject to any disclaimer, the term of this patent is extended or adjusted under 35 U.S.C. 154(b) by 0 days.

This patent is subject to a terminal disclaimer.

(21) Appl. No.: 17/542,922

(22) Filed: Dec. 6, 2021

(65) Prior Publication Data

US 2022/0094764 A1 Mar. 24, 2022

Related U.S. Application Data

(63) Continuation of application No. 17/001,104, filed on Aug. 24, 2020, now Pat. No. 11,196,840.

(30) Foreign Application Priority Data

Aug. 23, 2019 (KR) ........................ 10-2019-0104048

(51) Int. Cl.
*H04L 29/08* (2006.01)
*H04L 67/63* (2022.01)
(Continued)

(52) U.S. Cl.
CPC .............. *H04L 67/63* (2022.05); *H04L 45/22* (2013.01); *H04L 67/01* (2022.05);
(Continued)

(58) Field of Classification Search
CPC ........... H04W 36/0033; H04W 36/125; H04W 36/32; H04W 8/08; H04L 45/22; H04L 67/63

See application file for complete search history.

(56) References Cited

U.S. PATENT DOCUMENTS 10,419,983 B2 9/2019 Zhu
10,841,974 B1 11/2020 Young
(Continued)

FOREIGN PATENT DOCUMENTS

KR 1020170111175 10/2017
WO WO 2008/115116 9/2008
(Continued)

OTHER PUBLICATIONS

International Search Report dated Nov. 25, 2020 issued in counterpart application No. PCT/KR2020/011189, 13 pages.
(Continued)

*Primary Examiner* — Chirag R Patel
(74) *Attorney, Agent, or Firm* — The Farrell Law Firm, P.C.

(57) ABSTRACT

An application context relocation method performed by an edge enabler client (EEC) included in a user equipment (UE) in an edge computing system is provided. The application context relocation method includes determining to request an application context relocation by detecting that the application context relocation is required for a predicted or expected UE location; determining a target edge enabler server (T-EES) by using T-EES information received from an edge data network (EDN) configuration server; transmitting, to a source edge enabler server (SEES), an application context relocation request to start the application context relocation; receiving, from the S-EES, an application context relocation response, in response to the application context relocation request; and receiving, from the S-EES,
(Continued)

an application context relocation notification of completion of the application context relocation.

13 Claims, 5 Drawing Sheets

(51) Int. Cl.
*H04L 45/00* (2022.01)
*H04L 67/1031* (2022.01)
*H04L 67/1038* (2022.01)
*H04W 36/00* (2009.01)
*H04W 36/32* (2009.01)
*H04W 8/08* (2009.01)
*H04L 67/01* (2022.01)

(52) U.S. Cl.
CPC ...... *H04L 67/1031* (2013.01); *H04L 67/1038* (2013.01); *H04W 8/08* (2013.01); *H04W 36/0033* (2013.01); *H04W 36/32* (2013.01)

(56) References Cited

U.S. PATENT DOCUMENTS

| | | |
|---|---|---|
| 2003/0156559 A1 | 8/2003 | Yi et al. |
| 2010/0027497 A1 | 2/2010 | Pelletier |
| 2018/0242204 A1 | 8/2018 | Zhu et al. |
| 2019/0053108 A1 | 2/2019 | Trang et al. |
| 2019/0158606 A1 | 5/2019 | Guim Bernat et al. |
| 2019/0246252 A1 | 8/2019 | Rasmusson |
| 2020/0351745 A1 | 11/2020 | Aln |
| 2021/0007166 A1 | 1/2021 | Liao |
| 2022/0124147 A1* | 4/2022 | Ge .................. H04L 67/563 |

FOREIGN PATENT DOCUMENTS

| | | |
|---|---|---|
| WO | WO 2017/194619 | 11/2017 |
| WO | WO 2018/068835 | 4/2018 |

OTHER PUBLICATIONS

3GPP TR 23.758 V0.3.0 (Jul. 2019), 3rd Generation Partnership Project; Technical Specification Group Services and System Aspects; Study on Application architecture for enabling Edge Applications; (Release 17), Jul. 2019, pp. 42.

3GPP TS 23.501 V16.1.0 (Jun. 2019), 3rd Generation Partnership Project; Technical Specification Group Services and System Aspects; System Architecture for the 5G System; Stage 2 (Release 16), Jun. 2019, pp. 372.

3GPP TS 23.502 V16.1.1 (Jun. 2019), 3rd Generation Partnership Project; Technical Specification Group Services and System Aspects; Procedures for the 5G System; Stage 2 (Release 16), Jun. 2019, pp. 489.

Samsung, "New Solution for Application Context Relocation", S6-191700, 3GPP TSG-SA WG6 Meeting #33, Sep. 2-6, 2019, 5 pages.

European Search Report dated Aug. 1, 2022 issued in counterpart application No. 20859527.2-1213, 10 pages.

* cited by examiner

METHOD AND APPARATUS FOR PROVIDING DATA IN EDGE COMPUTING SYSTEM

CROSS-REFERENCE TO RELATED APPLICATION(S)

This application is a continuation of U.S. application Ser. No. 17/001,104, which was filed in the U.S. Patent and Trademark Office on Aug. 24, 2020, and is based on and claims priority under 35 U.S.C. 119 to Korean Patent Application No. 10-2019-0104048, which was filed in the Korean Intellectual Property Office on Aug. 23, 2019, the entire disclosure of each of which is incorporated herein by reference.

BACKGROUND

1. Field

The present disclosure relates generally to an apparatus and a method for providing a service in an edge computing system and particularly to an apparatus and a method for continuously providing a service to an electronic device in an edge computing system.

2. Description of Related Art

In order to use a low-delay or broadband service in an edge computing system, a terminal may establish a data connection to an edge data network (EDN) located close to the terminal. Further, in the edge computing system, the terminal may receive a data service by accessing an application server executed in an edge hosting environment or an edge computing platform operated by an edge enabler server (EES) of the corresponding EDN.

The terminal which desires to access the edge computing system may be a mobile communication terminal receiving a mobile communication service. The mobile communication terminal may access the EDN through the mobile communication network and may receive a service from a specific edge application server operated by an EES of the corresponding EDN. The mobile communication terminal should be able to move without any special restraints, and the service should be continuously provided. The mobile communication terminal may move from a first EDN area to a second EDN area. Even in this case, the service should be continuously provided to the mobile communication terminal in the edge computing system. However, a method of continuously providing the service when the EDN is changed due to movement of the mobile communication terminal has not yet been suggested.

SUMMARY

The present disclosure has been made to address at least the disadvantages described above and to provide at least the advantages described below.

In accordance with an aspect of the present disclosure, an application context relocation method performed by an edge enabler client (EEC) included in a user equipment (UE) in an edge computing system. The application context relocation method includes determining to request an application context relocation by detecting that the application context relocation is required for a predicted or expected UE location; determining a target edge enabler server (T-EES) by using T-EES information received from an edge data network (EDN) configuration server; transmitting, to a source edge enabler server (S-EES), an application context relocation request to start the application context relocation; receiving, from the S-EES, an application context relocation response, in response to the application context relocation request; and receiving, from the S-EES, an application context relocation notification of completion of the application context relocation.

In accordance with another aspect of the present disclosure, a UE is provided for use in an edge computing system. The UE includes an application client (AC) configured to an edge computing service from an edge application server (EAS); a mobile terminal (MT) configured to communicate with a mobile communication network and connect an edge data network (EDN) through the mobile communication network; and an edge enabler client (EEC) configured to determine that an application context relocation should be requested by detecting that the application context relocation is required for a predicted or expected UE location, determine a target edge enabler server (T-EES) by using T-EES information received from an EDN configuration server, transmit, to a source EES (S-EES), an application context relocation request to start the application context relocation, receive, from the S-EES, an application context relocation response, in response to the application context relocation request, and receive, from the S-EES, an application context relocation notification of completion of the application context relocation.

In accordance with another aspect of the present disclosure, an application context relocation method is provided for a source edge enabler server (S-EES) in an edge computing system. The application context relocation method includes receiving, form an edge enabler client (EEC), an application context relocation request to start an application context relocation; notifying, to an source edge application server (S-EAS), that the application context relocation is required; transmitting, to the EEC, an application context relocation response, in response to the application context relocation request; receiving, from the S-EAS, a notification that the application context relocation is complete; and transmitting, to the EEC, an application context relocation notification that the application context relocation is complete

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
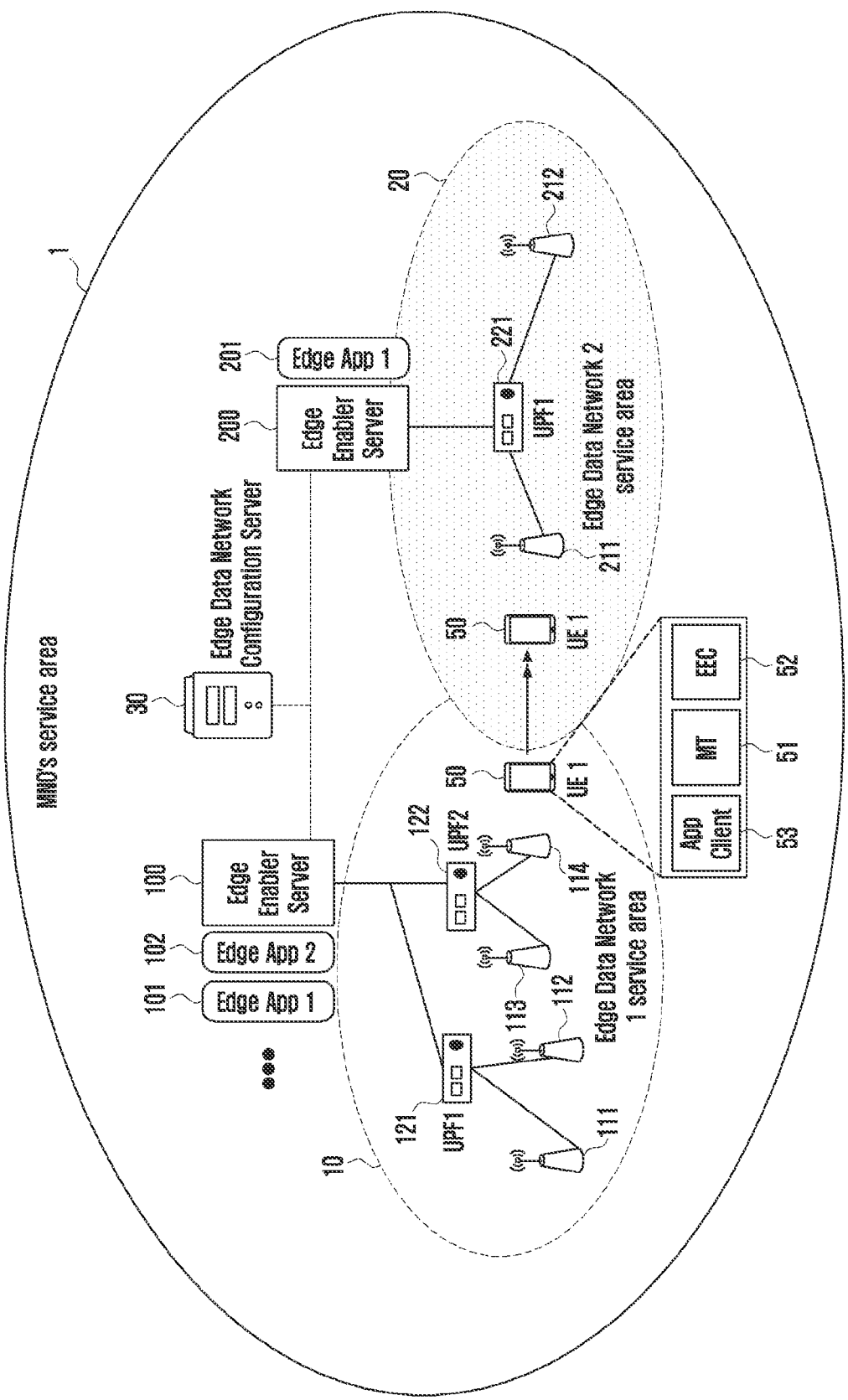
FIG. 1 illustrates a diagram of a connection to a 3GPP network and an edge computing system network and movement of a terminal, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

The terms referring to a network entity and entities of an edge computing system used in the disclosure, the terms referring to messages, and terms referring to identification information are described for convenience of description. Therefore, the disclosure may not be limited by the terminologies provided below, and other terms that indicate subjects having equivalent technical meanings may be used.

For convenience of description, the disclosure uses terms and names defined in a 5G system standard but is not limited to the terms and the names, and may be equally applied to a system following another standard.

Hereinafter, the disclosure describes a method of performing the application context relocation between edge application servers. In the edge computing system, a change in an edge application service providing an edge computing service to a terminal, that is, a mobile communication terminal may be needed. For example, the change may be needed when the mobile communication terminal moves from a specific data network to another data network or when the mobile communication terminal should access another data network from the specific data network due to a change in a wireless environment. In this case, a method of transmitting application context to a target edge application service that newly provides the service from a S-EAS that originally provides the service will be described below. Further, when the edge application server is changed, a method of detecting a need for the change and a method of selecting a new target edge application service will be described below. In addition, a procedure in which application context relocation is performed from the S-EAS that originally provides the service to the target application server on the basis of selection of the T-EAS will be described.

The disclosure describes in more detail a method of preserving service continuity. Specifically, the disclosure describes:

(1) How to detect the need to reroute traffic from the serving edge application server instance to the T-EAS.

(2) How to enable the required switch in the connection between the application client and the edge application server while preserving service continuity.

(3) How to transfer any required context between edge application servers within the EDN.

(4) How to transfer any required context from the serving edge application server to the T-EAS (or server) regardless of their location: in the same EDN, in a different EDN or in the cloud.

FIG. 1 illustrates a diagram of a connection to a 3GPP network and an edge competing system network and movement of a terminal, according to an embodiment.

Referring to FIG. 1, a service area 1 of a mobile network operator is illustrated. The service area 1 of the mobile network operator may include EDNs divided to provide edge computing services to electronic devices. Each EDN may have areas 10 and 20 for providing an edge computing service to an electronic device. FIG. 1 illustrates the case in which the service area 10 of the first EDN includes a first base station (BS) 111, a second BS 112, a third BS 113, and a fourth BS 114 and the service area 20 of the second EDN includes a fifth BS 211 and a sixth BS 212.

The service area 10 of the first EDN including the first BS 111 to the fourth BS 114 includes two different user plane functions (UPFs) 121 and 122. Further, the service area 20 has only one user plane function 221. The EDN may have one or more UPFs.

The service area 10 of the first EDN may be an area configured by one edge enabler server 100. The service area 20 of the second EDN may be an area configured by another edge enabler server 200. As described above, the service areas 10 and 20 of the EDNs may be configured as areas which can be managed by the edge enabler servers 100 and 200.

As illustrated in the example of FIG. 1, the edge enabler servers 100 and 200 may be connected to or may include the same or different edge application servers 101, 102, and 201. The first edge application servers 101 and 201 and the second edge application server 102 may provide different edge computing services. The first application server 201 located in the service area 20 of the second EDN that provides the same service as the first edge application server 101 located in the service area 10 of the first EDN may provide the edge computing service to an electronic device 50 through different edge enabler servers 100 and 200. The first edge application server 101 located in the service area 10 of the first EDN may provide the edge computing service to the electronic device 50 accessing one of the BSs 111, 112, 113, and 114 located in the first EDN. The second edge application server 102 may provide the edge computing service to the electronic device 50 accessing one of the BSs 111, 112, 113, and 114 located in the first EDN.

The electronic device 50 may receive the edge computing service and may be a terminal which can access a mobile communication network through a wireless network. The electronic device 50 may include various electronic devices which can move such as a smartphone, a tablet computer, a smart watch, a game device, a vehicle, a motorcycle, a bicycle, an airplane, and a ship and/or various types of electronic devices capable of providing an IoT service. The electronic device 50 may install at least one edge computing service application 53 according to the disclosure, and may include an EEC 52 and an MT 51 performing a wireless communication function, for example, communication layer.

The installation of the edge computing service application may mean that an application for receiving the edge computing service may be installed (or stored) in a memory of the electronic device 50. Further, the installation of the edge computing service application may mean that an operation for loading the application installed in the electronic device 50 in at least one processor to provide the edge computing service is performed.

The EEC 52 may be installed in the memory of the electronic device 50 installing the application for receiving the edge computing service. Further, the EEC 52 may be loaded to at least one processor instead of the installed application and perform at least some of the operations required by the edge computing service application.

The MT 51 may include a. communication layer capable of communicating with a specific wireless communication network, for example, a 3GPP communication network through a preset scheme. The communication layer may include at least one communication processor and/or a model, and include logic and at least one antenna for transmitting and receiving a wireless signal.

Hereinafter, the electronic device 50 is referred to as a UE for convenience of description. Layers or elements within the user device 50 may have interfaces for mutually exchanging information/data.

The BSs 111, 112, 113, 114, 211, and 212 have predetermined areas for communicating with the user device through a preset wireless communication scheme. When the wireless communication scheme is a scheme of a 3GPP mobile communication network, the BSs 111, 112, 113, 114, 211, 212 may be BSs of the 3GPP mobile communication network.

The UPFs 121, 122, and 221 may serve as gateways to and from which the user device transmits and receives packets. The UPFs 121, 122, and 221 may be located physically and/or logically close to the edge enabler servers 100 and 200 in order to support the edge computing service. By configuring the UPFs 121, 122, and 221 to be located physically and/or logically close to the edge enabler servers 100 and 200, it is possible to directly transmit data packets, to be provided to the user (or received from the user), to the EDN without passing through the Internet, thereby reducing transmission. That is, low-delay transmission is possible. The UPFs 121, 122, and 221 may be connected to the edge enabler servers 100 and 200 through a data network connected by the Internet.

According to an embodiment, the edge computing system may include edge enabler servers 100 and 200, an EDN configuration server 30, and the EEC 52. The edge enabler servers 100 and 200 may construct an edge hosting environment or an edge computing platform. The construction of the edge hosting environment or the edge computing platform may mean that the edge enabler server is connected to at least one edge application server or at least one edge application server is being driven on a computing platform of the edge enabler server. Accordingly, the edge enabler servers 100 and 200 may know information on the edge application server which is being driven within the edge hosting environment or driven on the edge computing platform.

According to various embodiments, the edge enabler server may negotiate with the user device 50 and connect the application client 52 driven in the user device 50 with the edge application server within the edge hosting environment. According to various embodiments, the user device 50 supporting the edge computing system may have the EEC embedded or installed therein as described above. According to an embodiment, negotiation between the user device 50 and the edge application server may be performed through mutual interworking between the EEC 52 within the user device 50 and the edge enabler servers 100 and 200. A layer performing the mutual interworking between the EEC 52 and the edge enabler servers 100 and 200 such as the negotiation may be an edge enabling layer.

According to various embodiments, the EDN configuration server 30 may know deployment information of the edge enabler servers 100 and 200 and may perform a function for transmitting configuration information to use the edge computing service to the user device 50. The configuration information may include at least one piece of EDN connection information, an EDN service area, and edge enabler server connection information.

According to various embodiments, the EDN connection information may include information, for example, a data network name and single-network slice selection assistance information (S-NSSAI). According to various embodiments, the EDN service area may be at least one of, for example, a cell list, a tracking area list, and a network identifier of an operator (PLMN ID) or may include two or more thereof. According to various embodiments, the edge enabler server connection information may be, for example, a uniform resource identifier (URI).

According to various embodiments, the user device 50 may receive information on an edge enabler server which the user device 50 can access from the EDN configuration server 30 on the basis of information on a specific location, for example, a specific BS, a specific data network, or a specific physical location. When the EDN configuration server 30 is able to know information on an edge application server which is being driven in an edge hosting environment of a specific edge enabler server, the user device 50 may also acquire the corresponding information through the EEC 52.

According to various embodiments, the edge application servers 101, 102, and 201 may be third-party application servers driven within the edge computing system. According to an embodiment, the edge application servers 101, 102, and 201 may be third-party application servers driven on infrastructure provided by the edge hosting environment, and may provide an ultra-low latency service since the service can be provided at a location close to the user device 50. According to various embodiments, information on a higher layer provided from the edge application server to the user device 50 may be referred to as application context. When the user uses a real-time game application, all pieces of information required for re-generating screens viewed by the user and play stages within the current game may be included in the application context. In order to allow the user device 50 to seamlessly use the existing service through the connection to another edge application server, the application context should be relocated in the edge application server in which the user device 50 will be newly connected. In order to relocate the application context, an edge application service for providing the service to an application being driven in the application client 53 of the user device 50 should be available. Availability of the edge application server within the EDN may be determined according to whether the edge application server is driven within the edge hosting environment and a state of the edge application server.

According to various embodiments, the user device 50 may include the application client 53, the EEC 52 for linking the application client 53 with the edge computing service, and the MT 51 accessing the mobile communication system as described above. According to various embodiments, the application of the user device 50 is an application provided by a third party and corresponds to a client application executed within the user device 50 for a specific application service. Two or more applications may be executed within the user device 50. According to an embodiment, at least one of the applications may use a multi-access edge computing (MEC) service. The EEC 52 within the user device 50 may be a client performing an operation within the user device 50 required for using the edge computing service. According to an embodiment, the EEC 52 may perform an operation for identifying which application can use the edge computing service and connecting to the network interface in order to transmit data of the application client of the user device 50 to the edge application server providing the edge computing service. According to an embodiment, the user device 50 may configure a radio channel with the BS through the MT 51 to use the edge computing service. The configuration of the radio channel may be performed by a communication layer of the MT 51, for example, a 3GPP communication layer. The communication layer of the MT 51 may serve to establish a wireless connection for data communication, registering the user device 50 in the mobile communication system, establishing a connection for transmitting data to the mobile communication system, and transmitting and receiving data.

As described above, the disclosure includes a method of relocating application context between edge application servers for service continuity in the edge computing system. As illustrated in FIG. 1, it may be assumed that the user device 50 may access the first EDN 10 and provide the edge computing service from the first edge application server 101. In this case, when the user device 50 moves to the service area 20 of the second EDN, a change in the edge application server is needed. A method of transmitting application context from the S-EAS to the target application server is required. Further, a method of detecting a need of the change in the edge application server is also required. In addition, a method of selecting a new edge application server and a method of relocating application context from the source application server on the basis of the selection method are further required.

The method of determining the relocation of the application context may need intervention of a network function of the 3GPP system described below. When the user device escapes an EDN service area, the session management function (SMF) may detect a need of a change in a user plane (UP) path and transmit a UP path management event notification to the corresponding edge application server. The edge application server receiving the UP path management event notification may recognize the need for the relocation of application context and start a relevant procedure.

However, in such a method, it is necessarily required to perform advance subscription for the UP path management event notification service in an SMF of the 3GPP by the edge application service providing the service to the user device. The user device may detect, in advance, the escaping from the EDN service area. However, the SMF of the 3GPP networks should recognize a need for the relocation of application context and a method of starting a relevant procedure should be recognized by the SMF. Further, the edge application server cannot start the relocation of application context before receiving a notification from the SMF, and thus a delay time may occur. In addition, overhead due to the subscription may be generated whenever the edge application server is added to provide a new edge application service. When a third-party application service provider installs and drives the edge application server rather than a network operator and an edge computing service provider, a negotiation of a service level may be overhead.

In the disclosure, in order to rapidly relocate the application context without the overhead, the user device should detect the need for the relocation of the application context and a method therefor should be provided. Therefore, a method by which the user device detects escaping from the data network service area may be included. Further, a method by which the user device determines an EDN to be newly connected and is connected to an edge enabler server and an edge application server of the corresponding EDN is needed.

Hereinafter, a method of determining a need for a relocation of application context in an edge computing system and a method of determining a target edge enabler/application server will be described with reference to FIG. 2.

Figure 2:
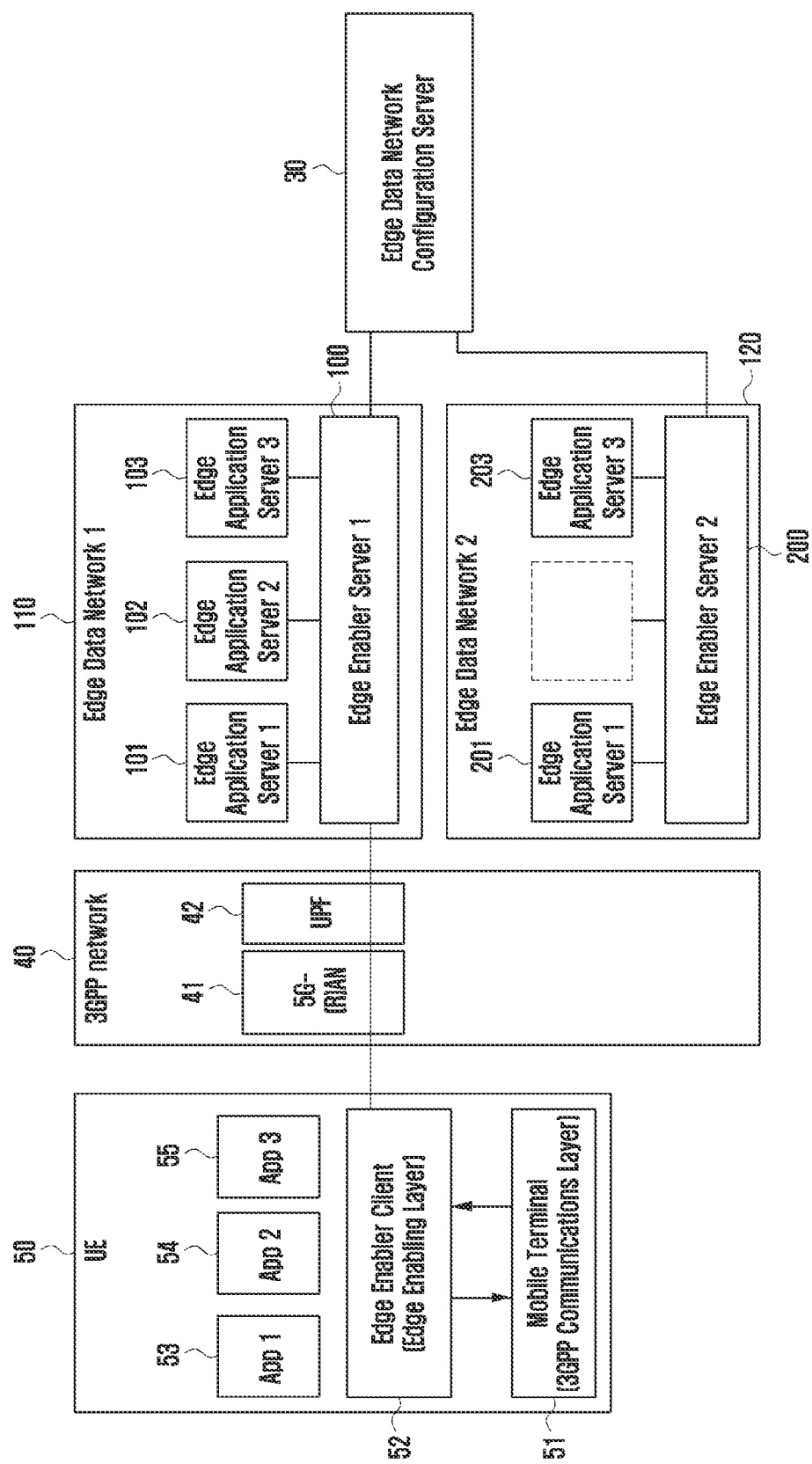
FIG. 2 illustrates an interaction between an EEC and a communication layer within a user device and a mutual connection with an edge computing system through a 3GPP network, according to an embodiment.

FIG. 2 illustrates an interaction between an EEC and a communication layer within a user device and a mutual connection with an edge computing system through a 3GPP network, according to an embodiment.

Referring to FIG. 2, the user device 50 may have the same configuration as that of FIG. 1 described above.

According to various embodiments, a first EDN 110 may include a first edge enabler server 100, and a first edge application server 101, a second edge application server 102, and a third edge application server 103 driven on an edge computing platform of the first edge enabler server 100. Although FIG. 2 illustrates that three edge application servers are driven in the first EDN 110, the first data network 110 may include more edge application servers or only one edge application server. According to various embodiments, the second EDN 210 may include a second edge enabler server 200, and a first edge application server 201 and a third edge application server 203 driven on an edge computing platform of the second edge enabler server 200. Although FIG. 2 illustrates that two edge application servers 201 and 203 are driven in the second EDN 120, the second data network 120 may include more edge application servers or only one edge application server.

According to an exemplary embodiment, the first edge application server 101 driven on the edge computing platform of the first EDN 110 and the first edge application server 201 driven on the edge computing platform of the second EDN 210 may be edge application servers performing the same function. When the first edge application server 101 driven on the edge computing platform of the first EDN 110 is an edge application server for providing a first service, the first edge application server 201 driven on the edge computing platform of the second EDN 210 may also be the edge application server for providing the first service. Similarly, when the third edge application server 103 driven on the edge computing platform of the first EDN 110 is an edge application server for providing a third service, the third edge application server 203 driven on the edge computing platform of the second EDN 210 may also be the edge application server for providing the third service.

The 3GPP network may configure a channel with the user terminal 50 through at least one BS among a plurality of BSs (5G-(R)ANs), and may transmit data to a user plane through a UPF. For the data of the user plane, a data path between the edge enabler server of the EDN and the user terminal may be configured through the UPF. FIG. 2 assumes that the user device 50 is connected to the first EDN 110 through the 3GPP network 40.

The second EDN 210 is different from the first EDN 110 in that the second EDN 210 does not include the second edge application server. As described above, EDNs may have edge application servers having the same respective functions. Further, there may be an edge application server that exists in a specific EDN but does not exist in a different EDN.

Each of the edge enabler servers 100 and 200 may access the EDN configuration server 30. The EDN configuration server 30 may be directly connected to the user device 50 through the 3GPP network.

The EEC 52 of the user device 50 may detect whether the MT 51 escapes the EDN service area on the basis of UE location information of the 3GPP communication layer. The EEC 52 may determine (identify) a need of the relocation of application context according to the result of detection.

According to an exemplary embodiment, as illustrated in FIG. 2, the enabler client 52 and the MT 51 may interact with each other, and the EEC 52 may identify whether the EEC 52 is within or escapes the EDN service area on the basis of information on the EDN service area or the edge enabler server service area stored in the EDN configuration server 30.

According to an embodiment, when it is determined that the EEC 52 escapes the EDN service area, the EEC 52 may trigger the relocation of the application context.

Before escaping the EDN service area, the EEC 52 may detect a possibility of the escaping. In this case, the EEC 52 may trigger the relocation of the application context.

According to another embodiment, the EEC 52 may identify whether the EEC 52 is within the EDN service area or escapes the EDN service area on the basis of available location information within the user device 50 without limiting the use of user device location (UE location) information of the MT 51.

According to various embodiments, when the edge application server service area matches the EDN service area, the user device 50 may identify the need for the relocation of application context to the EDN service area.

According to various embodiments, when the service area of the edge application server is limited to sonic of the EDN area, information on the service area of the edge application server may be compared with the UE location and a need for the relocation of application context may be identified. The information on the service area of the edge application server may be stored in the edge enabler server and/or the EDN configuration server 30. The information on the service area of the edge application server may be received from the EDN configuration server 30 by the EEC 52 as initial configuration information. The information on the service area of the edge application server may be acquired from the EDN configuration server 30 or from the edge enabler server through a request when the EEC 52 needs the information.

According to various embodiments, information on a quality of service from the MT 51 of the user device 50 or an application layer may be used. According to an embodiment, the EEC 52 of the user device 50 may detect generation of a deterioration of a quality of service from the MT 51 or an application layer and identify a need for the connection to the EDN providing a better quality of service and the relocation of application context.

According to various embodiments, the MT 51 within the user device 50 may know a quality of service of the currently connected EDN through mutual interworking with the 3GPP network. Further, a quality of service expected in the connection to another EDN may be known. The MT 51 within the user device 50 may know an expected quality of service through a network data analytics function.

According to various embodiments, an application layer may provide a quality of service of edge computing that can measure application level throughput (Goodput) to the EEC 52 and thus the EEC may use the same.

According to various embodiments, the EEC 52 may identify a need for the relocation of application context on the basis of availability of the edge application server and identify a target server.

According to various embodiments, when the S-EES cannot use the S-EAS, it may be determined that the relocation of application context is needed.

According to an embodiment, when an edge application service which the target edge enabler service to which the application context is transmitted can provide to the application client of the user device 50 is being executed or can be executed in an edge hosting environment, the EEC 52 may perform a procedure for relocating the application context. The availability information may be acquired from the edge enabler server or the EDN configuration server 30.

FIG. 2 illustrates that the second edge enabler server 200 of the second EDN 210 does not drive the second edge application server. In this case, the user device 50 may not directly relocate application context for the second application. After first identifying whether the second edge application server can be driven, the second edge enabler server 200 may provide availability information of the second edge application server to the EEC 52 or the EDN configuration server 30.

Hereinafter, procedures in which the user device 50 detects a need for the relocation of application context and relocates the application context will be described. A subject providing a command for relocating the application context is a T-EES 200 or a S-EES 100, which will be described with reference to two different embodiments.

Figure 3A:
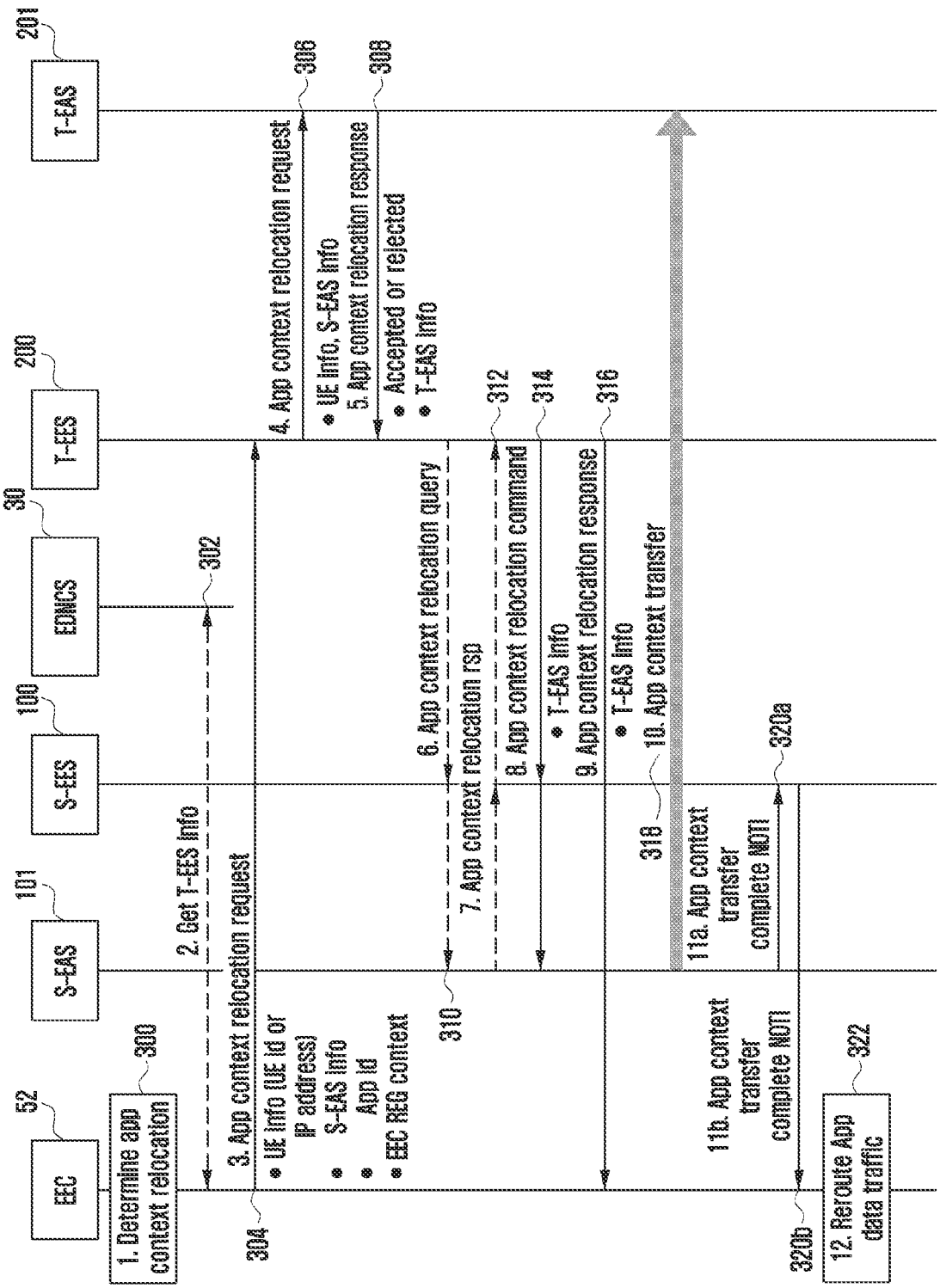
FIG. 3A is a signal flowchart illustrating a process in which the target edge enabler indicates the relocation of the application to the S-EAS, according to an embodiment.

FIG. 3A is a signal flowchart illustrating a process in which the target edge enabler indicates the relocation of the application to the S-EAS, according to an embodiment.

Referring to FIG. 3A, the EEC 52 of the user device 50 may determine whether there is a need for the relocation of application context at step 300. According to various embodiments, a trigger subject may be determined as follows. However, the subject for triggering the relocation of application context is not limited to the EEC 52 in the disclosure. The service area of the EDN and UE location information may be used, and all entities within the user device 50 capable of interworking with the edge enabler server through an edge enabler layer may trigger the relocation of application context. The application client 53 or the MT 51 may be configured to trigger the application context.

According to various embodiments, a method by which the EEC 52 within the user device 50 determines the need for the relocation of the application may be identified as follows.

In a first method, the need for the relocation may be determined through comparison between the EDN service and the UL location information.

When the user device escapes the data network service area, the relocation of application context may be triggered.

When movement possibility may be detected in advance before escaping from the EDN service area, the relocation of application context may be triggered.

When deterioration of a quality of service (QoS) of edge computing which the user device is receiving is detected, the need for the relocation of application context may be determined and triggered. As described above, triggering the relocation of application context is to continuously receive the service which is currently being provided from another edge application server.

When the terminal 51 recognizes the stopping of driving of the edge application server from which the service is currently being received, the relocation of application context may be triggered.

According to various embodiments, the EEC 52 of the user device 50 may determine a T-EAS in which the application context will be relocated at step 302.

According to various embodiments, the subject that determines the relocation of application context may be the terminal 51.

According to an embodiment, the terminal 51 may use an EDN service area included in EDN configuration information (configuration data), such a cell list, a tracking area list, and a network identifier of an operator (PLMN ID), in order to use the edge computing service.

According to an embodiment, as the EDN configuration information, initial configuration information received in initial access to the EDN configuration server may be used to utilize the edge computing service by the user device 50.

According to various embodiments, the user device may make a request for configuration information to the EDN configuration server 30, receive the configuration information, and use the same at step 302 of FIG. 3A.

According to another embodiment, when information on the edge application server executed in an edge hosting environment of a specific edge enabler server is stored in the EDN configuration server, the user device 50 may determine a T-EAS in the user device 50 through the step.

According to various embodiments, the subject of the operation is not limited to the EEC 52 of the user device 50. All subjects within the user device 50 capable of using the information may perform the operation.

According to various embodiments, the EEC 52 of the user device 50 may transmit a request for relocating application context to the transmission T-EES 200 at step 304.

The request for relocating the application context transmitted from the EEC 52 to the determined T-EAS may include the following information.

(1) Application information (for example, application ID): information for determining an edge application server for serving an application used by the user device 50 and information that can be used for determining a T-EAS may be included in the corresponding request.

(2) S-EAS information (for example, a fully qualified domain name (FQDN) or IP address) conventionally connected to the user device 50 may be included.

(3) UE information (for example, UE ID or UE IP address) may be included. UE information may include all pieces of information for identifying a UE within the edge computing system or the edge enabler server. An identifier separately defined or allocated within the edge computing system may be used. UE location information may be provided as necessary.

(4) Registration context for the S-EES of the EEC may be included. All pieces of information that can be used for registration in the T-EAS may be included in registration context and transmitted.

The T-EES 200 may determine a T-EAS in which the application context is relocated and transmit a request for relocating the application context to the T-EAS 201 at step 306.

The T-EES 200 may determine a T-EAS in which the application context is relocated on the basis of the following information.

(1) application ID and (2) whether the edge application for serving the application of the user device 50 is executed within the edge hosting environment When the edge enabler server receives the request for relocating the application context from the user device 50, the corresponding edge application server may not be being executed. Not executing the edge application server by the edge enabler server may mean that the edge application server exists within the edge computing platform but is not executed. In this case, the edge enabler server may execute the relevant edge application server for edge computing service continuity in the edge hosting environment and transmit the request for relocating the application context to the executed edge application server.

The edge enabler server does not execute the edge application server requested from the user device 50 and the execution may be not possible in the future. In this case, the edge enabler server may determine that the relocation of application context is not possible.

The edge enabler server may transmit a request for relocating the application context including information to the T-EAS on the basis of the determination, such as:

(1) UE information and (2) S-EAS information (e.g., information on the edge application server providing the conventional user device may be provided).

According to various embodiments, the T-EAS 201 may determine whether the application context can be relocated and transmit a response thereto to the target edge enable server 200 at step 308. The T-EAS 201 may determine whether to relocate the application context on the basis of computing resources and whether the execution continues in the future.

When the relocation of application context is approved, target edge application information (for example, FQDN or IP address) needed to receive transmission of the application context and whether to approve the same may be transmitted to the T-EES 200.

According to various embodiments, the T-EES 200 may inquire the S-EES 100 and/or the S-EAS 101 about whether to relocate the application context at step 310.

The T-EES 200 may transmit a query related to the relocation of application context to the S-EAS 101.

According to an embodiment, the T-EES may make a request for preparing the freezing and relocation of application context to the S-EAS 101.

According to an embodiment, UE information for specifying a UE corresponding to the relocation of application context may be provided to the S-EAS 101 through the procedure. Alternatively, the operation may be performed through provision of an application ID.

According to various embodiments, a message of the procedure may be directly transmitted from the T-EES 200 to the S-EAS 101, and may be transmitted to the S-EAS 101 via the S-EES 100.

According to various embodiments, the S-EAS 101 may transmit a response to the query about the relocation of the application context to the T-EES 200 at step 312.

According to an embodiment, the S-EAS 101 may identify the application context relocated in the T-EES 200 and perform a preparation step for transmission (for example, freezing the application context and synchronizing with the application client of the user device 50).

According to an embodiment, when the application has no context to be relocated due to a stateless characteristic, the S-EAS 101 may insert the fact into a response and transmit the response to the T-EES 200.

According to an embodiment, the subject and the order performing step 310 and step 312 in which the query about whether to relocate the application context and the response is transmitted are not limited to the situation. After determining the relocation of application context, the EEC may directly transmit the query to the S-EAS. According to another embodiment, the result of the response to the query may be reflected in the determination of the relocation of application context by transmitting the query before the EEC determines the relocation of application context. The following application context relocation command may be performed without steps 310 and 312.

According to various embodiments, the T-EES 200 may transmit the application context relocation command to the S-EES 100 and/or the S-EAS 101 at step 314.

According to an embodiment, the application context relocation may be indicated while information on the T-EAS 201 is transmitted to the S-EAS 101. According to an embodiment, if UE information or application information is not provided to the S-EAS 101 through step 310, the two pieces of information may be inserted into a command message and transmitted to specify an application to be relocated at step 314.

According to an embodiment, the corresponding command may be transmitted to the S-EAS 101 via the S-EES 100.

According to various embodiments, the T-EES 200 may transmit an application context relocation response to the EEC 52 of the user device 50 at step 316.

According to an embodiment, whether to relocate the application context and information on the T-EAS 201 may be transmitted to the EEC 52. The information on the T-EAS may be used for routing application data traffic after the application context is completely relocated.

According to various embodiments, the S-EAS 101 may transmit the application context to the T-EAS 201 at step 318.

According to an embodiment, the S-EAS 101 may transmit the application context to the T-EAS 201.

According to an embodiment, the application context may be transmitted via the source/target enabler servers 100 and 200 or may be directly transmitted to the T-EAS 201.

According to an embodiment, the transmission of the application context is not necessarily performed by the S-EAS 101. When the application context is stored in the user device 50, the EEC may directly transmit the application context stored in the user device 50 to the T-EAS 201. When the transmission of the application context between the S-EAS 101 and the T-EAS 201 is not possible, the application context may be transmitted by the EEC 52. A procedure in which the EEC 52 stores the application context from the S-EES 100 and the S-EAS 101 and registration context for the S-EES 100 in advance or receives the same through a request may be preceded.

According to an embodiment, the T-EAS 201 may provide acknowledgement indicating successful transmission of the application context to the S-EAS 101. Accordingly, the S-EAS 101 may identify whether the application context is successfully transmitted and trigger an operation for releasing context or resources for the corresponding application.

According to various embodiments, the S-EAS 101 may transmit an application context relocation complete notification message to the S-EES 100 at step 320a. The S-EAS 101 may transmit the fact that the application context is completely relocated to the user device 50 and reroute application data traffic at step 320a.

According to an embodiment, when there is no direct reference interface between the S-EAS 101 and the EEC 52, transmission of the corresponding notification may be performed via the S-EES 100 at steps 320a and 320b. The notification may be directly transmitted from the S-EAS 101 to the EEC 52. Further, steps 320a and 320b may be transmitted to the EEC 52 via the S-EES 100 and the T-EES 200. In this case, step 316b may be performed immediately before step 322.

According to various embodiments, the EEC 52 of the user device 50 may perform application data traffic rerouting at step 322. According to an embodiment, application data traffic generated by the edge application client may be routed to the T-EAS 201 in which the application context is completely relocated. Rerouting of the corresponding application data traffic may be directly performed by the S-EAS 101 rather than the EEC 52 through a predetermined network function of the 3GPP system (for example, AF influence on traffic routing). In this case, step 320 of transmitting the application context relocation complete notification message may not be performed. According to another embodiment, for the application context relocation complete notification, the S-EES 100 may perform the application data traffic routing through a method such as AF influence on traffic routing.

Figure 4:
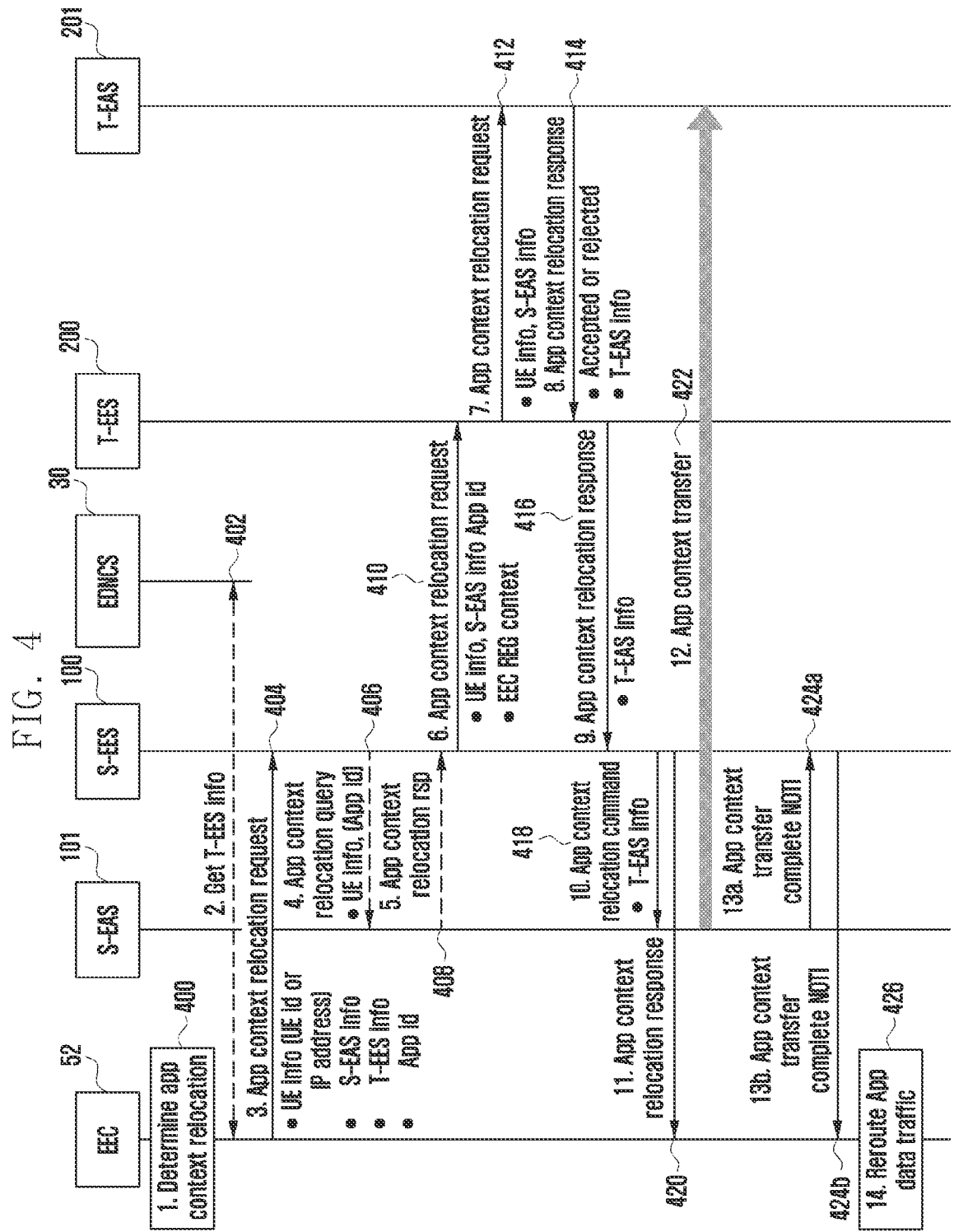
FIG. 4 is a signal flowchart illustrating a process in which an S-EES relocates application context in an S-EAS, according to an embodiment.

FIG. 4 is a signal flowchart illustrating a process in which an S-EES relocates application context in an S-EAS, according to an embodiment.

According to various embodiments, the EEC 52 of the user device 50 may determine (identify) a need for the relocation of application context at step 400.

According to an embodiment, the subject for triggering the relocation of application context within the user device 50 is not limited to the EEC 52. The EDN service area and UE location information may be used, and all entities within the user device 50 capable of interworking with the edge enabler server through an edge enabler layer may trigger the relocation of application context.

According to an embodiment, an example of a method of determining whether the relocation of application context is needed by the EEC 52 within the user device 50 is described below.

According to an embodiment, whether to trigger the relocation of application context may be determined through comparison between the EDN service and the UE location information.

According to another embodiment, when the user device escapes the EDN service area, the relocation of application context may be triggered.

According to another embodiment, when a possibility of escaping from the EDN service area is detected before the escaping, the relocation of application context may be triggered.

According to another embodiment, when deterioration of a QoS of edge computing which is provided to the user device is detected, the relocation of application context may be triggered. Triggering the relocation of the application context is for reception of the service from another edge application server.

According to another embodiment, when the stopping of execution of the edge application server which serves the user device 50 is recognized, the relocation of application context may be triggered.

According to various embodiments, the EEC 52 of the user device 50 may determine a T-EES in which the application context is relocated through step 402.

The EEC 52 may identify whether the user device is within the data network service area by using the EDN service area included EDN configuration information (configuration data), such as a cell list, a tracking area list, and a network identifier of an operator (public LAN mobile network (PLMN) ID), in order to use the edge computing service.

According to an embodiment, the EDN configuration information may use initial configuration information received in initial access to the EDN configuration server 30 to use the edge computing service by the user device 50.

According to another embodiment, as described with reference to FIG. 2, configuration information may be received from the EDN configuration server 30 through a request and used.

According to another embodiment, when information on an edge application server executed in an edge hosting environment of a specific edge enabler server is stored within the EDN configuration server 30, a T-EAS may be determined within the user device 50 through the step.

According to various embodiments, the subject of step 402 is not limited to the EEC 52. All entities within the user device 50 capable of using the information may perform the operation.

According to various embodiments, the EEC 52 of the user device 50 may transmit a request for relocating application context to the S-EES 100.

The EEC 52 may transmit the request for relocating the application context to the determined S-EES 100, and the corresponding request may include the following information.

(1) Application information (for example, application ID) may be included. The application information may be information for determining an edge application server serving an application used by the user device 50. In addition to the application information, information that can be used for determining a T-EAS may be included in the corresponding request.

(2) S-EAS information (for example, FQDN or IP address) conventionally connected to the terminal may be included.

(3) UE information (for example, UE ID or UE IP address) may be included. According to an embodiment, all pieces of information for identifying a UE within the edge computing system or the edge enabler server may be included. An identifier separately defined or allocated within the edge computing system may be used. UE location information may also be provided as necessary.

(4) T-EES information (for example, endpoint address such as a uniform resource identifier (URI)) may be included.

According to an embodiment, all pieces of information that help the EEC 52 to specify a T-EES may be included. According to an embodiment, when the EEC cannot provide the endpoint address of the T-EES, information for specifying the target EDN (for example, target EDN ID and UE location information) may be provided instead. Accordingly, the S-EES may specify the T-EES.

According to various embodiments, the S-EES 100 may inquire the S-EAS 101 about whether to relocate application context at step 406.

According to an embodiment, the S-EES 100 may transmit a query related to the relocation of application context to the S-EAS 101.

According to an embodiment, a query message may make a request for performing a preparation step of freezing and relocating the application context for the corresponding UE to the S-EAS 101.

According to an embodiment, the S-EES 100 may provide UE information to the S-EAS 101 to specify application context for the corresponding UE required to be relocated. The S-EES 100 may perform step 406 by providing an application ID.

According to various embodiments, the S-EAS 101 may transmit a response to the relocation of the application context to the S-EES 100 at step 408.

According to an embodiment, the application context, which is received from the S-EES 100 and is to be relocated, may be identified and a preparation step for transmission (for example, freezing the application context and synchronizing with the application client of the user device 50) may be performed.

According to an embodiment, when the application has no context to be relocated due to a stateless characteristic, the fact may be inserted into a response transmitted to the S-EES 100 and the response may be transmitted.

According to an embodiment, the subject and the order of performing step 406 and step 408 in which the query about whether to relocate the application context and the response is transmitted are not limited to the situation. According to an embodiment, after determining the relocation of the application context, the EEC 52 may directly transmit the query to the S-EAS 101. According to another embodiment, the result of the response to the query may be reflected in the determination of the relocation of application context by transmitting the query before the EEC 52 determines the relocation of the application context. According to another embodiment, an application context relocation command may be transmitted without steps 406 and 408.

According to various embodiments, the S-EES 100 may transmit a request for relocating the application context to the T-EES 200 at step 410.

The request at step 410 may include the following information.

(1) Application information (for example, application ID) may be included. Information for determining an edge application server which can serve an application used by the user device 50 may be included.

(2) S-EAS information (for example, FQDN or IP address) conventionally connected to the user device 50 may be included.

(3) UE information (for example, UE ID or UE IP address) may be included.

(4) Registration context for the conventional S-EES of the EEC may be included.

According to an embodiment, all pieces of information that can be used for registration in the T-EES may be included in registration context.

According to various embodiments, the T-EES 200 may determine an edge application server in which the application is relocated and transmit the request for relocating the application context to the corresponding T-EAS 201 at step 412.

According to an embodiment, the T-EES 200 may determine a (T-EAS) in which the application context is relocated on the basis of the following information.

(1) Application ID may be included and (2) Whether to execute the edge application for serving an application of the user device within an edge hosting environment may be included.

According to an embodiment, the request for relocating the application context including information may be transmitted to the determined T-EAS. (1) UE information may be included. (2) S-EAS information (edge application server providing the service to the conventional terminal) may be included.

According to various embodiments, the T-EAS 201 may determine whether the relocation of application context is possible and transmit a response thereto to the T-EES 200.

According to an embodiment, the T-EAS 201 may determine whether to relocate the application context on the basis of computing resources and whether execution continues in the future.

According to an embodiment, when the relocation of application context is approved, the T-EAS 201 may transmit target edge application information (for example, FQDN or IP address) required for receiving the application context and whether to approve the relocation to the T-EES 200.

According to various embodiments, the T-EES 200 may transmit an application context relocation response to the S-EES 100 at step 416. According to an embodiment, whether to relocate the application context and T-EAS information may be transmitted to the S-EES 100.

According to various embodiments, the S-EES 100 may transmit an application context relocation command to the S-EAS 101 at step 418.

According to an embodiment, the application context relocation may be indicated while the edge application server information is transmitted to the S-EAS 101.

According to an embodiment, if UE information or application information is not provided to the S-EAS 101 through step 406, the two pieces of information may be inserted into a command message and transmitted to specify an application to be relocated at step 418.

According to various embodiments, the S-EES 100 may transmit the application context relocation response to the EEC 52 of the user device 50 at step 420.

According to various embodiments, the S-EAS 101 may transmit application context to the T-EAS 201 at step 422.

According to an embodiment, the application context may be transmitted via the source/T-EESs or may be directly transmitted to the T-EAS.

According to an embodiment, the transmission of the application context is not necessarily performed by the S-EAS 101. When the application context is stored in the user device 50, the EEC 52 may directly transmit the application context stored in the user device 50 to the T-EAS 201.

According to another embodiment, when the application context cannot be transmitted between the S-EAS 101 and the T-EAS 201, the application context may be transmitted via the edge enabler servers 100 and 200. As described above, a procedure in which the EEC 52 stores the application context from the S-EES 100 and the source application server 101 and registration context for the S-EES 100 in advance or receives the same through a request may be preceded.

According to another embodiment, the T-EAS 201 may provide acknowledgement indicating successful transmission of the application context to the S-EAS 101. Accordingly, the S-EAS 101 may identify whether the application context is successfully transmitted and trigger an operation for releasing context or resources for the corresponding application.

According to various embodiments, the S-EAS 101 may transmit an application context relocation complete notification message to the S-EES 100 and/or the EEC 52.

According to various embodiments, the S-EAS 101 may transmit an application context relocation complete notification to the S-EES 100 and/or the T-EES 200 (101→100→200). The case will be described with reference to FIG. 3B.

Figure 3B:
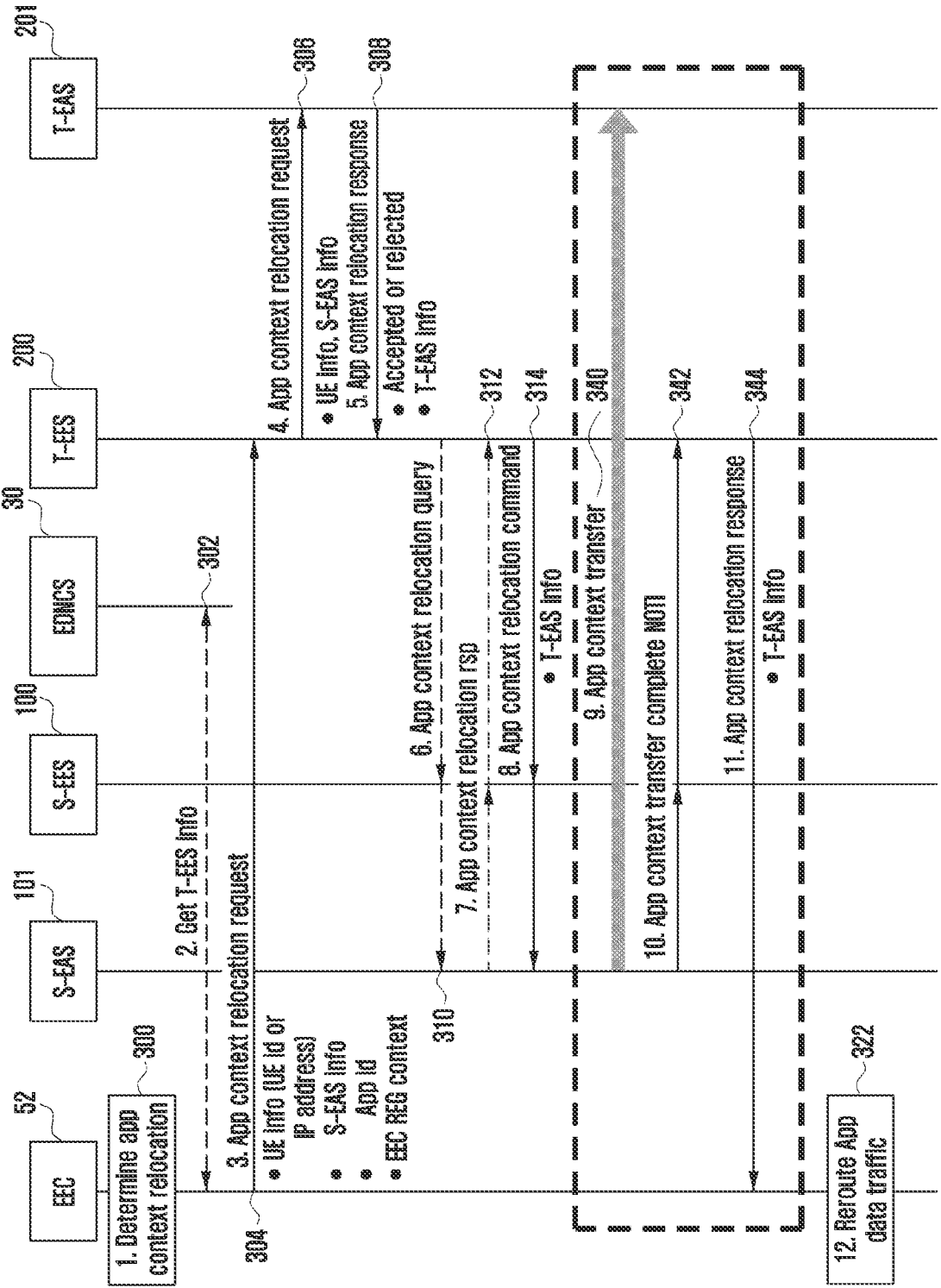
FIG. 3B is a signal flowchart illustrating a process in which an S-EAS transmits an application context relocation complete notification to a user device, according to an embodiment.

FIG. 3B is a signal flowchart illustrating a process in which an S-EAS transmits an application context relocation complete notification to a user device, according to an embodiment.

Prior to referring to FIG. 3B, FIGS. 3A and 3B have a difference at steps 340 to 344 corresponding to a dotted line part illustrated in FIG. 3B. Referring to FIG. 3B, a procedure no. 9 (step 316 of FIG. 3A) may be performed through a combination with the application context relocation complete notification right after step 318 of FIG. 3A. In FIG. 3B, the step is divided into step 340 and step 342. In this case, edge application context transmitted at step 340 (step 318 of FIG. 3A) is transmitted before step 342 (step 320 of FIG. 3A) along with the application context relocation complete notification. When communication between the EEC 52 and the S-EES 100 is not possible, the S-EAS 101 and/or the S-EES 100 may indirectly transmit the application context relocation complete notification and the T-EAS information to the EEC 52 via the T-EES 200 at step 344.

According to an embodiment, the application context relocation completion is transmitted to the user device 50 and application data traffic may be rerouted to the user device 50.

According to an embodiment, when there is no direct reference interface between the S-EAS 101 and the EEC 52, transmission of the corresponding notification may be performed via the S-EES 100 at steps 424a and 424b. Further, steps 424a and 424b may be transmitted to the EEC 52 via the S-EES 100 and the T-EES 200. According to another embodiment, when there is a direct reference interface between the S-EAS 101 and the EEC 52, the S-EAS 101 may perform direct transmission to the EEC 52.

According to various embodiments, the EEC 52 of the user device 50 may perform application data traffic rerouting at step 426.

According to an embodiment, application data traffic generated by the edge application client may be routed to the T-EAS 201 in which the application context is completely relocated.

According to an embodiment, routing of the corresponding application data traffic may be directly performed by the S-EAS 101 rather than the EEC 52 through a 3GPP system network function (for example, application function (AF) influence on traffic routing). In this case, the step of transmitting the application context relocation complete notification of step 424 may not be performed. According to another embodiment, the S-EES 100 receiving the application context relocation complete notification may perform the application data traffic routing through a method such as AF influence on traffic routing.

The embodiments described above may include an operation in which the edge enabler server makes a final decision and transmitting an application context relocation command to the S-EAS. However, in the disclosure, the subject for transmitting the final application context relocation command to the S-EAS is not limited to the edge enabler server 100. The T-EES 200 may directly transmit the application context relocation command to the S-EAS 101.

The team "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

A method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above subcomponents may be omitted, or additional other subcomponents may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least sonic operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An application context relocation method performed by an edge enabler client (EEC) included in a user equipment (UE) in an edge computing system, the application context relocation method comprising:
    determining to request an application context relocation by detecting, by the EEC, that the application context relocation is required for a predicted or expected UE location;
    determining a target edge enabler server (T-EES) by using T-EES information received from an edge data network (EDN) configuration server;
    transmitting, to a source edge enabler server (S-EES), an application context relocation request to start the application context relocation;
    receiving, from the S-EES, an application context relocation response, in response to the application context relocation request; and
    receiving, from the S-EES, an application context relocation notification of completion of the application context relocation.

2. The application context relocation method of claim 1, wherein the predicted or expected UE location indicates at least one of a cell or a tracking area identifying a network to which the UE is connected.

3. The application context relocation method of claim 1, wherein the T-EES information includes a uniform resource identifier (URI) for connecting to the T-EES.

4. The application context relocation method of claim 1, further comprising rerouting application data to a target edge application server (T-EAS), based on the application context relocation response.

5. The application context relocation method of claim 1, wherein the application context relocation request includes a UE identifier (ID) and a fully qualified domain name (FQDN) of a source edge application server (S-EAS).

6. A user equipment (UE) for use in an edge computing system, the UE comprising:
    an application client (AC) configured to an edge computing service from an edge application server (EAS);
    a mobile terminal (MT) configured to communicate with a mobile communication network and connect an edge data network (EDN) through the mobile communication network; and
    an edge enabler client (EEC) configured to:
        determine that an application context relocation should be requested by detecting that the application context relocation is required for a predicted or expected UE location,
        determine a target edge enabler server (T-EES) by using T-EES information received from an EDN configuration server,
        transmit, to a source EES (S-EES), an application context relocation request to start the application context relocation,
        receive, from the S-EES, an application context relocation response, in response to the application context relocation request, and
        receive, from the S-EES, an application context relocation notification of completion of the application context relocation.

7. The UE of claim 6, wherein the predicted or expected UE location indicates at least one of a cell or a tracking area identifying a network to which the UE is connected.

8. The UE of claim 6, wherein the T-EES information includes a uniform resource identifier (URI) for connecting to the T-EES.

9. The UE of claim 6, wherein the EEC is further configured to reroute application data to a target EAS (T-EAS), based on the application context relocation response.

10. The UE of claim 6, wherein the application context relocation request includes a UE identifier (ID) and a fully qualified domain name (FQDN) of a source EAS (S-EAS).

11. An application context relocation method performed by a source edge enabler server (S-EES) in an edge computing system, the application context relocation method comprising:
    receiving, from an edge enabler client (EEC), an application context relocation request to start an application context relocation;
    notifying, to an source edge application server (S-EAS), that the application context relocation is required;
    transmitting, to the EEC, an application context relocation response, in response to the application context relocation request;
    receiving, from the S-EAS, a notification that the application context relocation is complete; and
    transmitting, to the EEC, an application context relocation notification that the application context relocation is complete.

12. The application context relocation method of claim 11, wherein the application context relocation request includes a UE identifier (ID) and a fully qualified domain name (FQDN) of the S-EAS.

13. The application context relocation method of claim 11, further comprising:
  transmitting an application context relocation command including the T-EAS information to the S-EAS providing an application service to the UE; and
  transmitting an application context to the T-EAS through the T-EES when the application context is received from the S-EAS.

\* \* \* \* \*